US00RE38302E

(19) United States
(12) Reissued Patent
Rieger

(10) Patent Number: US RE38,302 E
(45) Date of Reissued Patent: Nov. 11, 2003

(54) RETRACTABLE HANDLE FOR MARINE CRAFT

(75) Inventor: Paul J. Rieger, Arrington, TN (US)

(73) Assignee: Triton Boat Company, L.P., Ashland City, TN (US)

(21) Appl. No.: 10/223,900

(22) Filed: Aug. 20, 2002

Related U.S. Patent Documents

Reissue of:
(64) Patent No.: 6,109,200
Issued: Aug. 29, 2000
Appl. No.: 09/338,201
Filed: Jun. 22, 1999

(51) Int. Cl.[7] ..... B63B 17/00
(52) U.S. Cl. ..... 114/363; 16/429; 297/183.2
(58) Field of Search ..... 114/363, 254; 16/429, 115; 297/183.1, 183.2, 183.9, 464, 475, 474

(56) References Cited

U.S. PATENT DOCUMENTS 855,139 A * 5/1907 Scott
1,462,914 A * 7/1923 Jackson
2,480,915 A * 9/1949 George
2,488,858 A * 11/1949 Granz
2,878,981 A * 3/1959 Guido
3,052,896 A * 9/1962 Beach
4,431,234 A * 2/1984 Lacey
4,969,610 A * 11/1990 Taylor et al.
5,100,354 A * 3/1992 Woolley et al.
5,570,654 A * 11/1996 Rood
5,755,650 A * 5/1998 Urso
5,857,246 A * 1/1999 Becnel

* cited by examiner

*Primary Examiner*—Sherman Basinger
(74) *Attorney, Agent, or Firm*—Luedeka, Neely & Graham, P.C.

(57) ABSTRACT

A retractable handle apparatus is grasped and extended by an occupant of a marine craft to restrain motion of the occupant during sudden movement of the vessel. The apparatus includes a hand grip, a retracting mechanism, and a flexible member interconnecting the hand grip and retracting mechanism. The hand grip is pulled by the occupant to unwind the flexible member from the retracting mechanism. In the fully extended position, the apparatus provides resistance which the occupant uses to restrain against motion. When the hand grip is released, the retracting mechanism retrieves the flexible member.

40 Claims, 3 Drawing Sheets

RETRACTABLE HANDLE FOR MARINE CRAFT

Matter enclosed in heavy brackets [ ] appears in the original patent but forms no part of this reissue specification; matter printed in italics indicates the additions made by reissue.

FIELD OF THE INVENTION

This invention relates generally to restraint devices for occupants of a marine craft. More particularly, the invention relates to a retractable hand grip which an occupant of a marine craft may grasp and extend in order to restrain movement of the occupant when the marine craft is in motion.

BACKGROUND

Marine craft often travel at high speeds across water. The acceleration of the craft causes the occupants inside the craft to be affected by inertial forces, and for purposes of safety and comfort the occupants must restrain themselves against such forces. Sudden movements, particularly movement in a vertical plane due to wave bouncing, are most troubling because they give a marine craft occupant little time to prepare for restraint. This problem tends to be magnified in smaller craft which are more susceptible to small waves and disturbances on the surface of the water because of their shallow displacement. Seated occupants are bounced about in the seats and require equipment to restrain their movement. Unfortunately, most marine craft have few, if any, effective restraining devices.

Much of the prior art in seating restraining devices has been oriented toward land vehicles. This includes full restraints such as shoulder and waist restraints. In those vehicles, shoulder and waist restraints serve their purpose well in restraining a person during sudden acceleration or deceleration, particularly collision. In marine craft, however, full restraints are not practical. Collisions or other accidents often result in sunken or overturned vehicles. Shoulder and waist restraints can trap occupants below water in overturned or sunken vessels. Thus, full restraints are adverse to safety on marine craft and are generally not practical.

Other restraints such as hand-holds and loop-holds are useful and provide the marine craft occupant restraint when desired and mobility when the restraint is not necessary. Unfortunately, these restraints often obstruct or interfere with the utility of a space. Much of the equipment used on marine craft is bulky or awkward, such as fishing gear, scuba equipment, and water skis, and any obtrusive parts in the craft can interfere with the use and enjoyment of such equipment. There is very limited space in small marine craft, and it must be used efficiently. Thus, marine craft have the need for an unobtrusive, yet easily reached and effective restraint device that can be placed on or near a seat in a marine vessel.

SUMMARY

With regard to the foregoing and other objects, the invention provides a retractable hand grip restraint capable of being grasped by a seated occupant of a marine craft. When not in use, a retracting feature allows the grip to be automatically restored to its original position out of the way of the occupants of the marine craft, reducing its obtrusiveness.

The invention includes a retracting mechanism which winds a flexible member, such as a woven web of polyester, about a rotating member when the rotating member is rotated in a first direction. When the rotating member is rotated in a second direction, the flexible member unwinds from the rotating member. The flexible member is connected to a hand grip which is pulled by an occupant of the marine craft to unwind the flexible member from the rotating member. The occupant may grasp and extend the hand grip in anticipation of movement. Upon complete extension, the hand grip and flexible member provide the occupant with resistance and a range of movement to counter the movement of the marine craft. Other than a woven web, the flexible member embodiments includes a line, such as a rope, string or cable.

In one embodiment, a guide member is provided between the retracting mechanism and the hand grip encompassing the flexible member. The guide member guides the flexible member through its extension. The guide member is narrow enough to prohibit movement of the hand grip through the guide member, thereby arresting motion of the flexible member in the first direction. Additional guide members may be utilized to route the flexible member when the retracting mechanism is placed remotely from the hand grip.

The present invention includes a hand grip made of a rigid loop. The loop has a sufficient opening to allow a marine craft occupant to comfortably insert a hand therethrough and form a fist about the end of the loop. It is important that the hand grip have a construction to facilitate a firm and stable grasp by the occupant.

Another aspect of the present invention includes a seat assembly containing a retractable handle apparatus, as described above. The hand grip is mounted on the seat within easy reach of the seat occupant. The retracting mechanism is placed in a void space within or beneath the seat. This prevents obstruction of other areas external to the seat. A guide member, as described above, can be mounted on the exterior surface of the seat, such as on the front side of the seat bottom. The guide member is positioned to arrest motion at the location desired for grasping the hand grip.

In accordance with another aspect of the present invention, a marine craft includes a retractable handle apparatus, as described above. The retractable handle is adjacent to a seat assembly on a structural member of the marine craft. The retracting mechanism is mounted in any void space in order to prevent its interference with activity in the craft. A guide member, as described above, can be mounted on a structural member of the marine craft where the hand grip is desired to be located. If the retracting mechanism is removed far from the hand grip or awkwardly placed, additional guide members may be utilized to assist in routing the flexible member to the location of the retracting mechanism.

BRIEF DESCRIPTION OF THE DRAWINGS

The above and other features, aspects and advantages of the present invention will now be discussed in the following detailed description and appended claims considered in conjunction with the accompanying drawings in which:

DETAILED DESCRIPTION OF A PREFERRED EMBODIMENT

Figure 1:
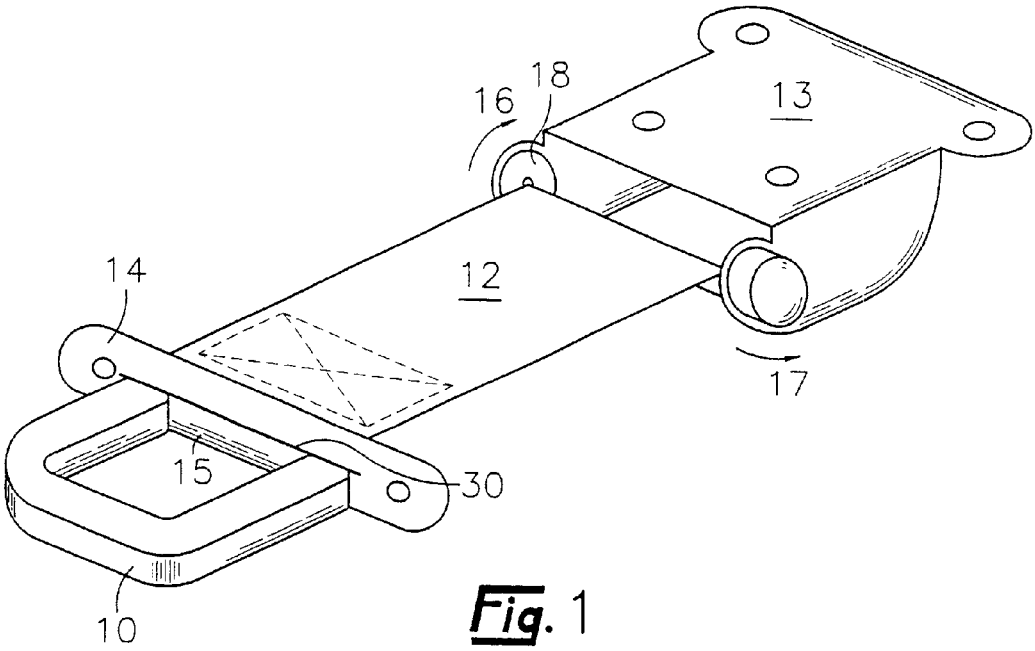
FIG. 1 is a perspective view of a retractable handle for a marine craft according to the present invention, including a flexible web member and a guide member.

Referring now to the drawings in which like reference characters designate like or similar parts throughout the several views, FIG. 1 illustrates a perspective view of a retractable handle 50 for a marine craft according to the present invention. As shown, the retractable handle includes a hand grip 10, a flexible member 12, and a retracting mechanism 13. The hand grip 10 is preferably a D-ring type grip made of a rigid material. It will be understood, however, that the hand grip 10 may be provided in a variety of shapes so as to conform to the user's hand. It will also be understood that the hand grip 10 may be fabricated from a resilient material.

The hand grip 10 is attached to a flexible member, such as a woven web 12 of polyester fibers. The web 12 is preferably attached to the hand grip 10 by way of a loop 15 formed around the hand grip 10 at one end of the web 12. In an alternative embodiment, shown in FIG. 2, the flexible member is a line 12' having a substantially circular cross-sectional dimension such as a string, rope, or cable.

Figure 2:
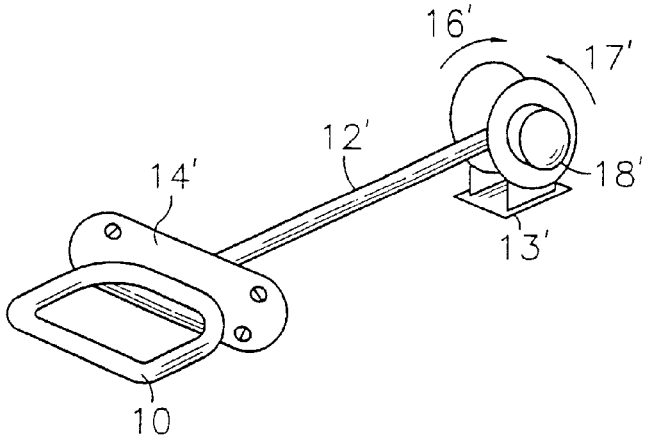
FIG. 2 is a perspective view of a retractable handle for a marine craft according to the present invention including a flexible line member.
Figure 3:
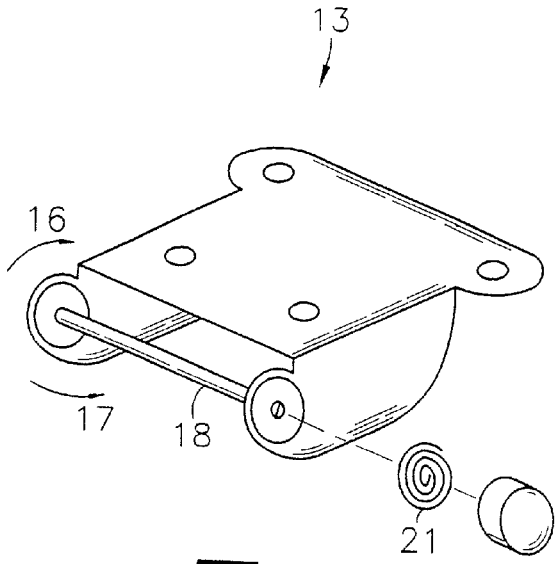
FIG. 3 is a perspective view of a retracting mechanism according to the present invention.

With continued reference to FIGS. 1 and 2, the flexible member is wound in a first direction 16, 16', about a rotating member or spool 18, 18', which forms a portion of the retracting mechanism 13, 13'. Motion in the first direction 16 (retraction) is urged by an actuator, which in a preferred embodiment is a spiral coil spring 21 (FIG. 3). It is recognized that the actuator 21 may be any suitable mechanism used for urging rotation of the spool 18. A suitable retracting mechanism 13 is one available from Indiana Marine Corporation under model no. 53451-B.

In operation, the hand grip 10 is grasped and extended away from the retracting mechanism 13 with force sufficient to overcome the force applied to the spool 18 by the actuator 21. This action causes the flexible member 12 to unwind from the spool 18 in a second direction 17, 17'. At full extension (which in a preferred embodiment is about six inches but may vary depending on placement) the spool 18 ceases rotation and provides resistance to the flexible member 12, and thus to the hand grip 10. The user may now use the resistance to restrain against marine craft motion.

As the hand grip 10 is released, the spool 18 is urged in the first direction 16 by the actuator 21, causing the flexible member 12 to rewind about the spool 18, and thereby retracting the hand grip 10 to its stowage position.

Also, shown in FIGS. 1 and 2 is an optional guide member 14, 14'. The guide member 14 receives and guides the flexible member 12 to assist in proper winding 16 and unwinding 17. When the hand grip 10 is pulled to unwind the flexible member 12 from the spool 18, the guide member 14 guides the flexible member to maintain proper alignment with the spool 18. When the hand grip 10 is released and the flexible member 12 rewinds about the spool 18, the guide member 14 once again guides and maintains proper positioning of the flexible member 12. The guide member 14 includes an opening 30 sufficiently large to receive the flexible member 12 but too small to receive the hand grip 10. Thus, the guide member 14 also functions to limit travel of the hand grip 10 in the first direction 16.

Figure 4:
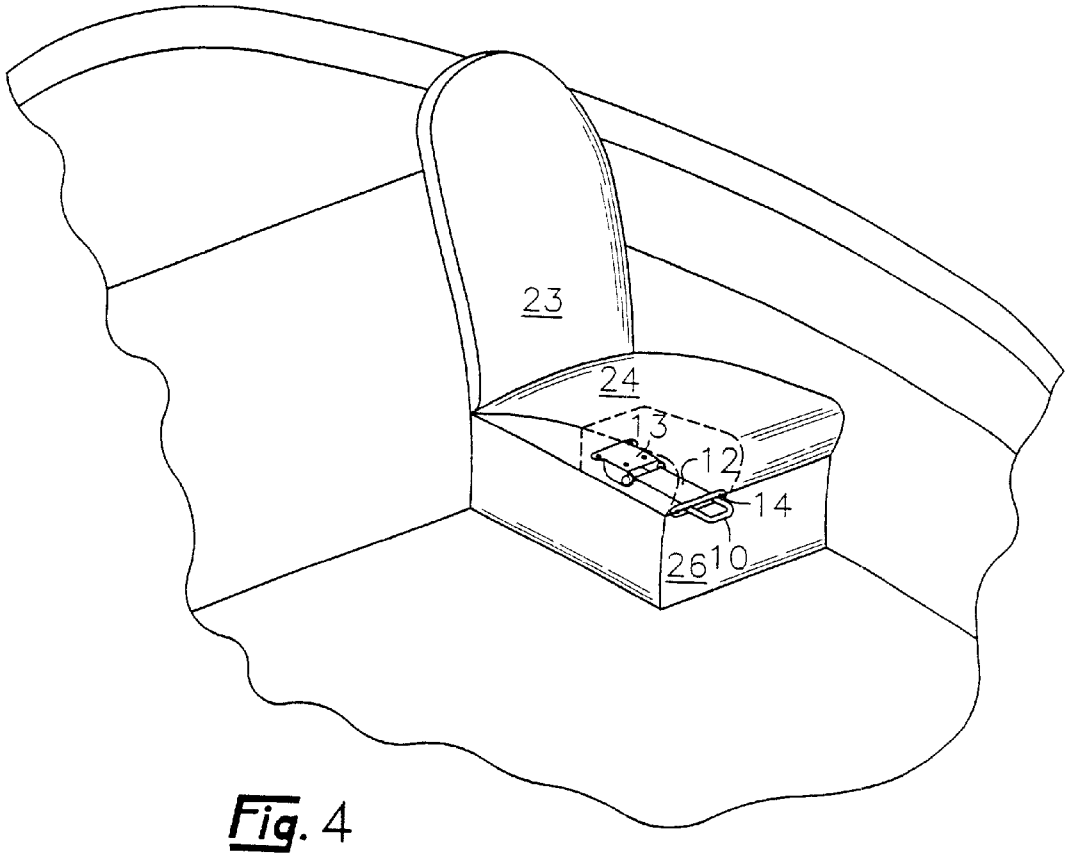
FIG. 4 is a perspective view of a marine craft seat with a retractable handle positioned on the of the seat bottom and the retracting mechanism positioned inside the seat.

In a preferred embodiment, the retractable handle 50 is positioned for use by a seated occupant of the marine craft. As illustrated in FIG. 4, the hand grip 10 is placed in reach of the occupant adjacent the front portion of the seat bottom 24. The guide member 14 is attached to the exterior of the seat bottom 24 and the hand grip 10 is placed on the exterior side of the guide member 14. Thus, the hand grip 10 lies flush to the guide member 14 and seat bottom 24 to minimize interference when not in use. The retracting mechanism 13 is mounted under the seat bottom 24 to be unobtrusive. It is contemplated that positioning the invention anywhere on the seat assembly 25, including the back 23, and within reach of the seat occupant is also an acceptable modification.

Figure 5:
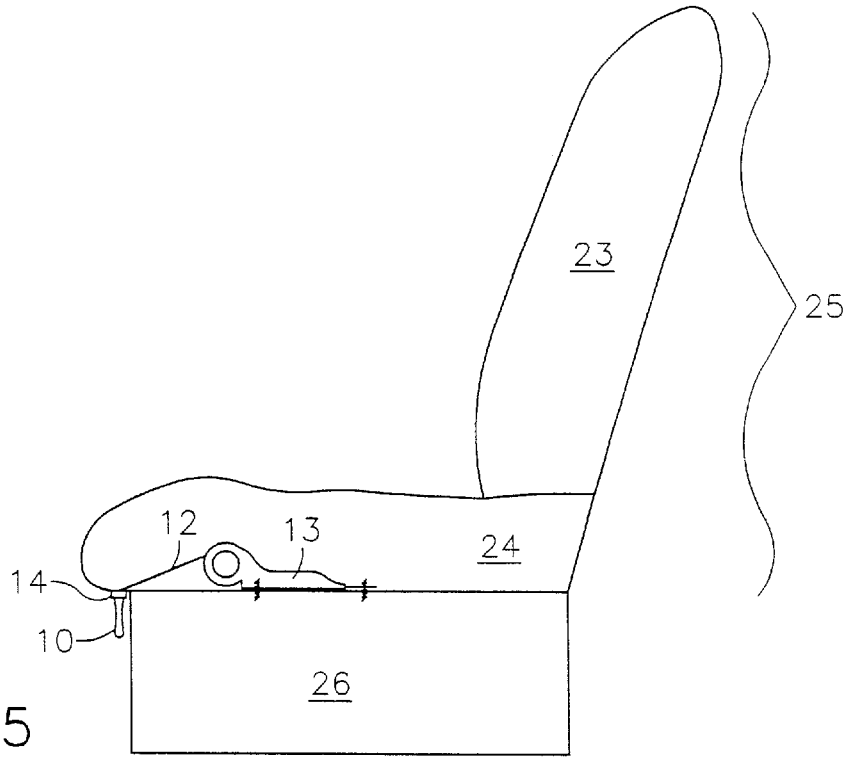
FIG. 5 a view of the marine craft seat of FIG. 4.
Figure 6:
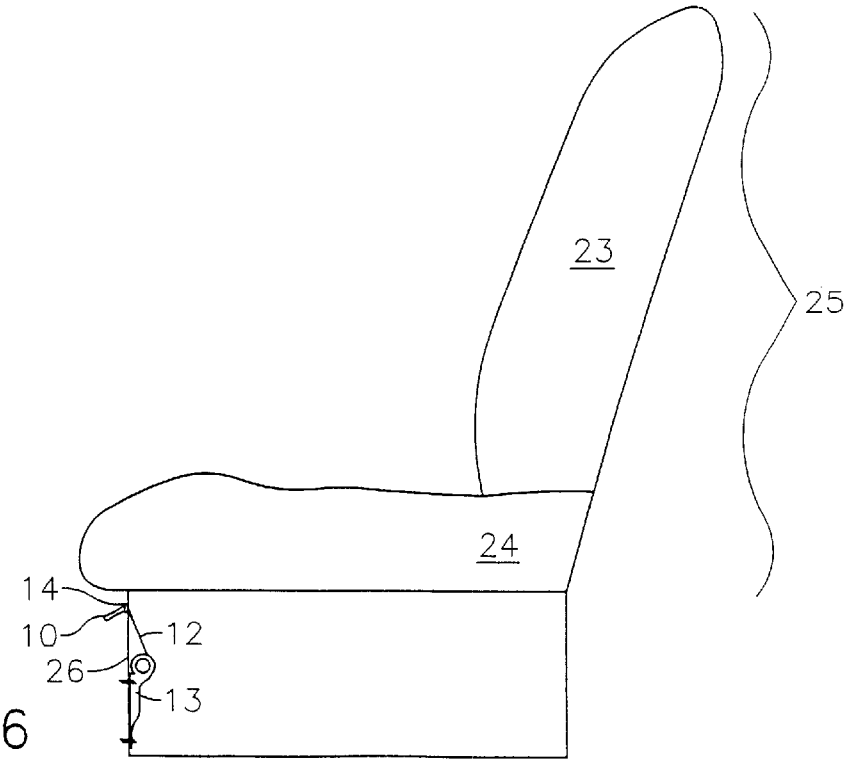
FIG. 6 is a side view of a marine craft seat with a retractable handle positioned adjacent to the seat bottom and the retracting mechanism mounted to a marine craft structural member below the seat.

In another embodiment, illustrated in FIG. 5, the retractable handle 50 is positioned adjacent to seat assembly 25 on a structural member 26 of the marine craft. The hand grip 10 is positioned within reach of a seated occupant for effective restraint. The guide member 14 is mounted to the structural member 26 with the hand grip 10 located on the exterior side of the structural member 26. The retracting mechanism is mounted on the interior of the structural member 26 to avoid interference. Also, the retracting mechanism 13 may be mounted any distance away on the same or another structural member for most efficient use of void space. A plurality of guide members 14 may be employed as necessary to provide proper routing and alignment of the flexible member 12 between the hand grip 10 and the retracting mechanism 13.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. An apparatus for restraining movement of an occupant of a marine craft, the apparatus comprising:

a hand grip;

a tensile retraction device having:

a rotating member for being rotated in opposed first and second directions; and an actuator with force for urging said rotating member in the first direction; and a flexible member interconnecting the hand grip and the rotating member and being wound about said rotating member such that when the hand grip is grasped and pulled by an occupant of the marine craft with sufficient force to overcome the force applied to said rotating member by said actuator, the rotating member is rotated in the second direction to unwind the flexible member from the rotating member, and when the force applied to the rotating member by the occupant is less than the force applied to the rotating member by said actuator, the rotating member is rotated in the first direction to wind said flexible member about the rotating member;

wherein said tensile retraction device is configured to enable an occupant seated in the marine craft to extend the hand grip a limited distance such that, when extended to said limited distance, the hand grip serves as a handle for being used by the marine craft occupant to restrain the occupant's movement within the marine craft when the marine craft is in motion.

2. An apparatus as described in claim 1 wherein the hand grip includes a loop of rigid material.

3. An apparatus as described in claim 1 wherein said actuator includes a spring.

4. An apparatus as described in claim 3 wherein said spring includes a spiral coil spring.

5. An apparatus as described in claim 1 wherein said flexible member includes a woven web.

6. An apparatus as described in claim 1 wherein said flexible member includes a line having a substantially circular cross sectional dimension.

7. An apparatus as described in claim 1 further comprising one or more guide members located between the tensile retraction device and hand grip for guiding said flexible member as it winds and unwinds from said rotating member.

8. An apparatus as described in claim 1 wherein said rotating member includes a spool.

9. A seat for supporting an occupant of a marine craft, the seat comprising:

a bottom;

a back connected to said bottom;

a hand grip sufficiently proximate the seat to allow an occupant of the seat to grasp the hand grip from a sitting position;

a tensile retraction device attached to said bottom or said back having:

a rotating member for being rotated in opposed first and second directions; and an actuator with force for urging said rotating member in the first direction; and a flexible member interconnecting the hand grip and the rotating member and being wound about said rotating member such that when the hand grip is grasped and pulled by an occupant of the marine craft with sufficient force to overcome the force applied to said rotating member by said actuator, the rotating member is rotated in the second direction to unwind the flexible member from the rotating member, and when the force applied to the rotating member by the occupant is less than the force applied to the rotating member by said actuator, the rotating member is rotated in the first direction to wind said flexible member about the rotating member;

wherein said tensile retraction device is configured to enable an occupant seated in the marine craft to extend the hand grip a limited distance such that, when extended to said limited distance, the hand grip serves as a handle for being used by the marine craft occupant to restrain the occupant's movement within the marine craft when the marine craft is in motion.

10. An apparatus as described in claim 9 wherein the hand grip includes a loop of rigid material.

11. An apparatus as described in claim 9 wherein said actuator includes a spring.

12. An apparatus as described in claim 11 wherein said spring includes a spiral coil spring.

13. An apparatus as described in claim 9 wherein said flexible member includes a woven web.

14. An apparatus as described in claim 9 wherein said flexible member includes a line having a substantially circular cross sectional dimension.

15. An apparatus as described in claim 9 further comprising one or more guide members located between the tensile retraction device and hand grip for guiding said flexible member as it winds and unwinds from said rotating member.

16. An apparatus as described in claim 9 where said rotating member includes a spool.

17. A marine craft having a seat for transporting an occupant of the marine craft across water, the marine craft comprising:

a seat comprising:

a bottom; and a back connected to said bottom;

a hand grip sufficiently proximate the seat to allow an occupant of the seat to grasp the hand grip from a sitting position;

a structural support member;

a tensile retraction device attached to said structural support member having:

a rotating member for being rotated in opposed first and second directions; and an actuator with force for urging said rotating member in the first direction; and a flexible member interconnecting the hand grip and the rotating member and being circularly wound about said rotating member such that when the hand grip is grasped and pulled by an occupant of the marine craft with sufficient force to overcome the force applied to said rotating member by said actuator, the rotating member is rotated in the second direction to unwind the flexible member from the rotating member, and when the force applied to the rotating member by the occupant is less than the force applied to the rotating member by said actuator, the rotating member is rotated in the first direction to wind said flexible member about the rotating member;

wherein said tensile retraction device is configured to enable an occupant seated in the marine craft to extend the hand grip a limited distance such that, when extended to said limited distance, the hand grip serves as a handle for being used by the marine craft occupant to restrain the occupant's movement within the marine craft when the marine craft is in motion.

18. An apparatus as described in claim 17 wherein the hand grip includes a loop of rigid material.

19. An apparatus as described in claim 17 wherein said actuator includes a spring.

20. An apparatus as described in claim 19 wherein said spring includes a spiral coil spring.

21. An apparatus for restraining movement of an occupant of a marine craft, the apparatus comprising:

a hand grip capable of being grasped by an occupant of a marine craft, said hand grip including a loop with an inner circumference sufficiently large to enable the occupant to insert a substantial portion of the occupant's hand through the loop and sufficiently small to prevent insertion of the occupant's torso through the loop;

a tensile retraction device having:

a rotating member for being rotated in opposed first and second directions; and an actuator with force for urging said rotating member in the first direction; and a flexible member interconnecting the hand grip and the rotating member and being wound about said rotating member such that when the hand grip is grasped and pulled by an occupant of the marine craft with sufficient force to overcome the force applied to said rotating member by said actuator, the rotating member is rotated in the second direction to unwind the flexible member from the rotating member, and when the force applied to the rotating member by the occupant is less than the force applied to the rotating member by said actuator, the rotating member is rotated in the first direction to wind said flexible member about the rotating member;

wherein said tensile retraction device is configured to enable an occupant seated in the marine craft to extend the hand grip a limited distance such that, when extended to said limited distance, the hand grip serves as a handle for being used by the marine craft occupant to restrain the occupant's movement within the marine craft when the marine craft is in motion.

22. The apparatus of claim 21 wherein the hand grip is a loop of rigid material.

23. The apparatus of claim 21 wherein the hand grip is a loop of flexible material.

24. The apparatus of claim 21 wherein said flexible member is a woven web.

25. The apparatus of claim 21 wherein said flexible member is a line having a substantially circular cross sectional dimension.

26. An apparatus for restraining movement of an occupant of a marine craft, the apparatus comprising:

a hand grip for being grasped by an occupant of a marine craft;

a tensile retraction device anchored to the marine craft and having:

a rotating member for being rotated in opposed first and second directions; and an actuator with force for urging said rotating member in the first direction;

a flexible member having a first end in opposed relation to a second end and defining a length therebetween, said first end being attached to said hand grip and said second end being attached to said rotating member, said flexible member being wound about the rotating member such that when the hand grip is grasped and pulled by an occupant of the marine craft with sufficient force to overcome the force applied to said rotating member by said actuator, the rotating member is rotated in the second direction to unwind the flexible member from the rotating member and thereby extend the hand grip, and when the force applied to the rotating member by the occupant is less than the force applied to the rotating member by said actuator, the rotating member is rotated in the first direction to wind said flexible member about the rotating member and thereby retract the hand grip; and wherein the length of the flexible member is sufficiently small to enable an occupant seated in the marine craft to fully extend the hand grip such that, when fully extended, the hand grip serves as a handle for being used by the marine craft occupant to restrain the occupant's movement within the marine craft when the marine craft is in motion.

*27. An apparatus for restraining movement of an occupant of a marine craft, the apparatus comprising:*

*a hand grip;*

*a retracting mechanism; and*

*a flexible member operatively associated with the hand grip and the retracting mechanism such that when the hand grip is grasped and pulled by an occupant of the marine craft the flexible member is extended from the retracting mechanism, and when the hand grip is released by the marine craft occupant the flexible member is retracted by the retracting mechanism;*

*wherein said retracting mechanism is configured to enable an occupant seated in the marine craft to extend the hand grip a limited distance such that, when extended to said limited distance, the hand grip serves as a handle for being used by the marine craft occupant to restrain the occupant's movement within the marine craft when the marine craft is in motion.*

*28. An apparatus as described in claim 27 wherein said retracting mechanism includes a movable member.*

*29. An apparatus as described in claim 28 wherein said flexible member is attached to said movable member.*

*30. An apparatus as described in claim 28 wherein said flexible member moves around said movable member.*

*31. An apparatus as described in claim 27 wherein said retracting mechanism includes:*

*a movable member for being moved in opposed first and second directions; and*

*an actuator with force for urging said movable member in the first direction.*

*32. An apparatus as described in claim 31 wherein said actuator includes a spring.*

*33. An apparatus for restraining movement of an occupant of a marine craft, the apparatus comprising:*

*a hand grip;*

*a retracting mechanism having an actuator with force; and*

*a flexible member operatively associated with the hand grip and the retracting mechanism and being configured such that when the hand grip is grasped and pulled by an occupant of the marine craft with sufficient force to overcome the force of the actuator, the flexible member is extended from the retracting mechanism, and when the force applied by the occupant to the hand grip is less than the force of the actuator, the flexible member is retracted by the retracting mechanism;*

*wherein said retracting mechanism is configured to enable an occupant seated in the marine craft to extend the hand grip a limited distance such that, when extended to said limited distance, the hand grip serves as a handle for being used by the marine craft occupant to restrain the occupant's movement within the marine craft when the marine craft is in motion.*

*34. An apparatus as described in claim 33 wherein said actuator includes a spring.*

*35. An apparatus as described in claim 33 wherein said hand grip includes a loop of rigid material.*

*36. An apparatus as described in claim 33 wherein said retracting mechanism further includes a movable member for being urged by the force of said actuator.*

*37. An apparatus for restraining movement of an occupant of a marine craft, the apparatus comprising:*

*a hand grip;*

*a retracting mechanism having:*

*a movable member for being moved in opposed first and second directions; and*

*an actuator with force for urging said movable member in the first direction; and*

*a flexible member operatively associated with the hand grip and the retracting mechanism such that when the hand grip is grasped and pulled by an occupant of the marine craft with sufficient force to overcome the force applied to the movable member by said actuator, the movable member is moved in the second direction to extend the flexible member from the retracting mechanism, and when the force applied to the hand grip by the marine craft occupant is less than the force applied to movable member by said actuator, the movable member is moved in the first direction to retract said flexible member into the retracting mechanism;*

*wherein said retracting mechanism is configured to enable an occupant seated in the marine craft to extend the hand grip a limited distance such that, when extended to said limited distance, the hand grip serves as a handle for being used by the marine craft occupant to restrain the occupant's movement within the marine craft when the marine craft is in motion.*

*38. An apparatus as described in claim 37 wherein said hand grip includes a loop of rigid material.*

*39. An apparatus as described in claim 37 wherein said flexible member is configured and disposed for motion around said movable member during motion of said movable member.*

*40. An apparatus as described in claim 37 wherein said flexible member is attached to said movable member.*

* * * * *